May 15, 1928.  
W. H. SERGENT  
1,669,727  
SCORING DEVICE FOR CARAMEL WRAPPING MACHINES  
Filed May 27, 1926   3 Sheets-Sheet 1
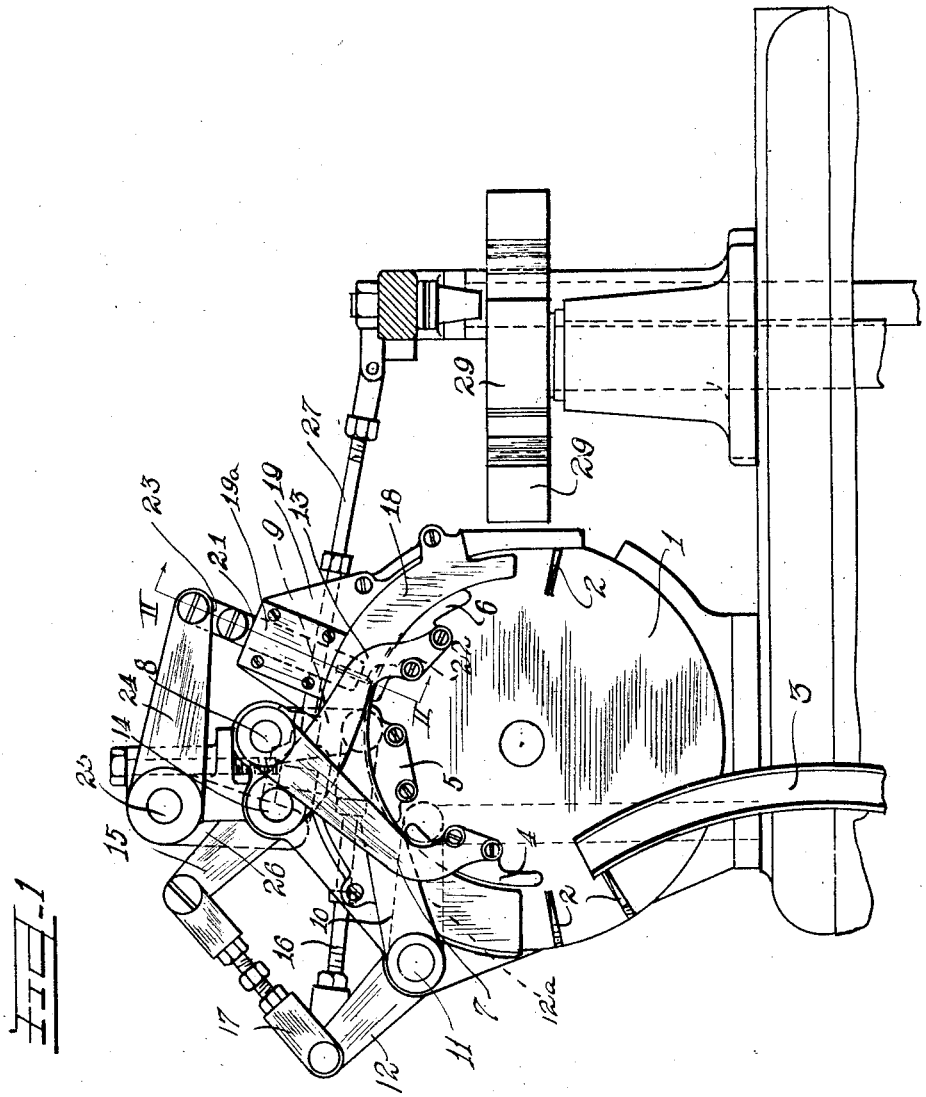
INVENTOR  
Walter H. Sergent  
BY Charles... ATTYS May 15, 1928.
W. H. SERGENT
1,669,727
SCORING DEVICE FOR CARAMEL WRAPPING MACHINES
Filed May 27, 1926     3 Sheets-Sheet 2
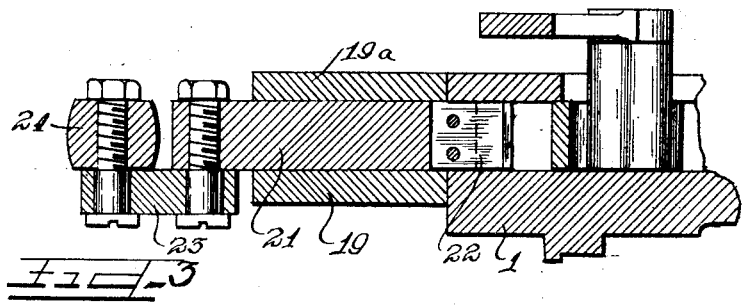
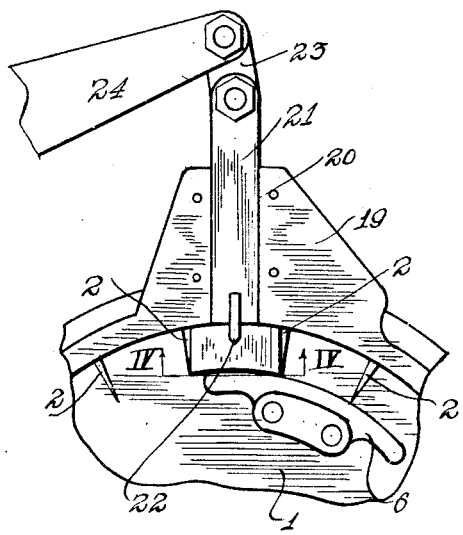
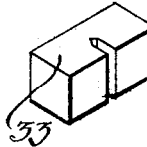
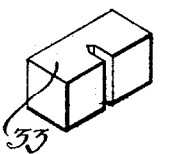
Inventor
Walter H. Sergent
By Charles... Attys May 15, 1928.
W. H. SERGENT
1,669,727
SCORING DEVICE FOR CARAMEL WRAPPING MACHINES
Filed May 27, 1926    3 Sheets-Sheet 3
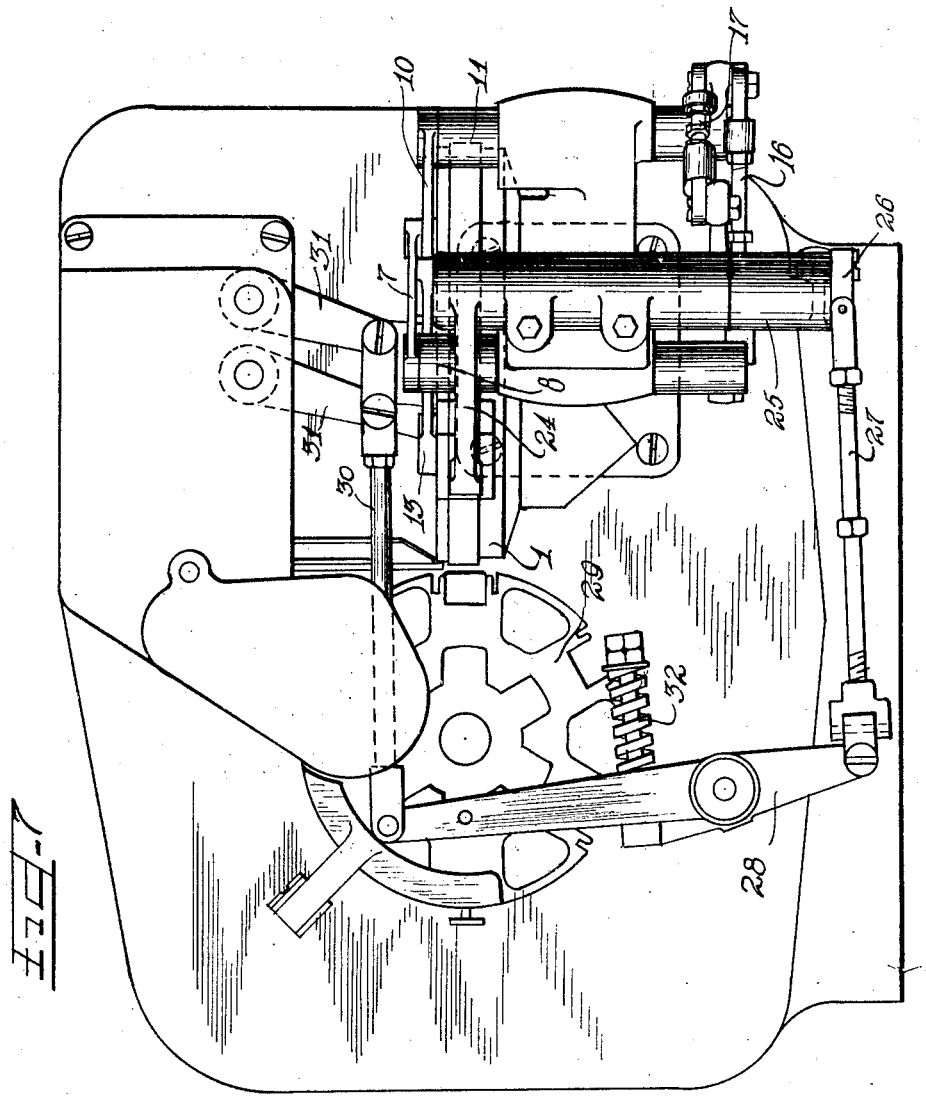
Inventor
Walter H. Sergent
by Charles M. Fills
Attys Patented May 15, 1928.

1,669,727

UNITED STATES PATENT OFFICE.

WALTER H. SERGENT, OF MIDDLETOWN, NEW YORK, ASSIGNOR TO IDEAL WRAPPING MACHINE COMPANY, A CORPORATION OF NEW YORK.

SCORING DEVICE FOR CARAMEL-WRAPPING MACHINES.

Application filed May 27, 1926. Serial No. 111,956.

This invention relates to a scoring device for caramel wrapping machines of that type involving a forming and cutter box in which the candy dough is pressed between cutters by a number of presser feet, as disclosed in the Hopkins and Fellows Patent No. 1,082,331.

The object of this invention is to provide a scoring device that operates in timed relation to the presser feet for scoring the caramels when acted upon by a presser foot.

The invention comprises the novel structure and combinations hereinafter described and more particularly pointed out and defined in the appended claims.

In the accompanying drawings, which illustrate a preferred embodiment of this invention and in which similar reference numerals refer to similar features in the different views:

Figure 1 is a top plan view of a caramel forming and cutter box with adjacent operating mechanism for the presser feet and scoring device;

Figure 2 is an enlarged sectional view upon the line II—II of Figure 1.

Figure 3 is an enlarged fragmentary top plan view of the cutter box showing the scoring device;

Figure 4 is an enlarged fragmentary sectional view upon the line IV—IV of Figure 3, with the caramel omitted and showing the guard in elevation.

Figure 5 is a perspective view of a scored caramel.

Figure 6 is a development of the caramel dough in the cutter box.

Figure 7 is a part sectional and part elevational view through a caramel wrapping machine illustrating the arrangement of certain parts.

In referring to the drawings, there is shown a caramel cutting and forming box 1 which is of cylindrical formation and which is adapted to be intermittently rotated as is well known in the art. Around the outer margin of the bottom of the box which is in the form of a disk, are spaced forming and cutting knives 2 between which the candy dough, which is fed to the box by means of a chute 3, is formed into pieces of suitable size by means of a plurality of presser feet 4, 5 and 6, the latter of which also completes the severance of the pieces.

The presser foot 4 is connected to an arm 7 secured to a shaft 8 upon which a lower arm 9, shown in dotted lines, is secured. The presser foot 5 is connected to an arm 10 secured to a shaft 11 having a bell crank lever with arms 12 and 12$^a$ attached to its lower end. The presser foot 6 is connected to an arm 13 secured upon a shaft 14 which has a crank arm 15 secured to its lower end. An adjustable link 16 connects the arms 9 with the arm 12 which in turn is connected by an adjustable link 17 to the arm 15. Obviously, the different presser feet are connected for conjoint movement and may be simultaneously operated by suitably connecting the source of power with the arm 12$^a$. Within the operative area of the presser feet 4, 5 and 6, there is an arcuate guard 18 over the cutters 2. Of course, it will be understood that the cutter box comprises a suitable circumferential wall.

Adjacent a suitable point of the outer circumference of the cutter box and directly opposite a presser foot, there is a platform or support 19 provided with a suitable groove 20, the bottom of which is in alinement with the top of the cutter disk 1. A reciprocating member 21 provided with a scoring element 22 upon its forward end is positioned in said groove and confined by a cover 19$^a$. The outer end of the reciprocating element is pivotally connected by means of a link 23 with a crank arm 24 secured upon a shaft 25. Below the crank 24, there is a second crank 26 on the shaft 25. The crank 26 is connected by an adjustable link 27 with a lever 28, (Figure 7), pivoted intermediate its ends and that carries the caramel ejector for the wrapping wheel 29. The lever 28 is connected to an operating link 30 supported by a pair of parallel links 31. The link 30 is adapted to be driven by the driving mechanism of the machine as disclosed in said patent.

It will be apparent that each actuation of the ejector lever 28 will rock shaft 25 and actuate the scoring device for scoring a caramel at the time it is being acted upon by the opposed presser foot which in the present instance is the presser foot 6 which is so timed in its operation as to be in pressing engagement with a caramel when the scoring device is actuated. A spring 32 acts upon the lever 28 tending to move the same toward ejecting position. When the lever 28 is drawn against the spring 32 to withdraw the ejector, the scoring device is also being withdrawn, and when the lever 28 moves to eject a caramel, the scoring device is actuated for scoring a caramel. It will be understood that these parts are operated between the intermittent rotation of the cutter box 1.

In Figures 5 and 6, there is shown a caramel 33 which is scored according to this invention. In Figure 6, the manner in which caramels are formed is illustrated. It will be noted that the caramel is scored when it is being severed by the presser foot 6 which is the shearing presser foot in that it is the only one that contacts the knives.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a candy wrapping machine, a rotary disk having spaced cutters, a plurality of presser feet for forcing the candy dough between said cutters, one of said presser feet severing the pieces of candy, and a scoring device for scoring each piece of candy as it is acted upon by the last mentioned presser foot.

2. In a candy wrapping machine, a rotary disk having spaced cutters, a plurality of presser feet for kneading the candy between said cutters and a scoring device independent of said presser feet for scoring the candy.

3. In a candy wrapping machine including an intermittently rotatable member having candy moulding means, pressing means for pressing candy dough in said moulding means between the intermittent movements of said member, and a scoring device independent of said pressing means and operable in timed relation therewith for scoring the pressed candy.

4. In a candy wrapping machine, an intermittently operated rotary member having spaced cutters, means for forcing candy dough between said cutters, and a scoring device separate from said means and operable in timed relation therewith for scoring said candy while acted upon by said means.

In testimony whereof I have hereunto subscribed my name.

WALTER H. SERGENT.